(12) United States Patent
Shimada et al.

(10) Patent No.: US 7,220,009 B2
(45) Date of Patent: May 22, 2007

(54) OPTICAL DEFLECTOR

(75) Inventors: Yasuhiro Shimada, Sagamihara (JP); Takahisa Kato, Atsugi (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 11/003,455

(22) Filed: Dec. 6, 2004

(65) Prior Publication Data
US 2005/0128609 A1 Jun. 16, 2005

(30) Foreign Application Priority Data
Dec. 12, 2003 (JP) ............................. 2003-415786

(51) Int. Cl.
*G02B 5/08* (2006.01)
(52) U.S. Cl. .................. 359/849; 359/291; 359/290; 359/224
(58) Field of Classification Search ................ 359/849, 359/214, 298, 222–226, 290, 291, 292
See application file for complete search history.

(56) References Cited

U.S. PATENT DOCUMENTS

| 4,317,611 | A | 3/1982 | Petersen |
| 4,421,381 | A | 12/1983 | Ueda et al. |
| 5,819,822 | A * | 10/1998 | Schneider et al. .......... 141/285 |
| 6,201,226 | B1 | 3/2001 | Shimada et al. |
| 6,215,114 | B1 | 4/2001 | Yagi et al. |
| 6,327,087 | B1 | 12/2001 | Hashimoto et al. |
| 6,333,497 | B2 | 12/2001 | Shimada et al. |
| 6,334,573 | B1 * | 1/2002 | Li et al. ................. 235/462.32 |
| 6,335,522 | B1 | 1/2002 | Shimada et al. |
| 6,408,123 | B1 | 6/2002 | Kuroda et al. |
| 6,436,265 | B1 | 8/2002 | Shimada et al. |
| 6,477,132 | B1 | 11/2002 | Azuma et al. |
| 6,795,225 | B2 * | 9/2004 | Tsuboi et al. ................ 359/224 |
| 6,859,121 | B2 * | 2/2005 | Arima .......................... 335/78 |
| 6,900,925 | B2 | 5/2005 | Kato et al. |
| 2005/0129353 | A1 | 6/2005 | Torashima et al. |
| 2005/0179985 | A1 | 8/2005 | Kato et al. |

FOREIGN PATENT DOCUMENTS

| JP | 60-082711 | 3/1984 |
| JP | 60-057051 | 4/1985 |
| JP | 60-057052 | 4/1985 |
| JP | 60-107017 | 6/1985 |
| JP | 04-343318 | 11/1992 |

\* cited by examiner

*Primary Examiner*—Ricky Mack
*Assistant Examiner*—Tuyen Tra
(74) *Attorney, Agent, or Firm*—Fitzpatrick, Cella, Harper & Scinto

(57) ABSTRACT

The present invention provides a resonance type micro-oscillating member capable of retraining a fluctuation of angular velocity, and specifically provides a micro-oscillating member, which is a nested micro-oscillating member, wherein there exist a reference oscillation mode which is the characteristic oscillation mode of a reference frequency, and an even numbered oscillation mode which is the characteristic oscillation mode of a frequency being approximate even number times the reference frequency.

15 Claims, 10 Drawing Sheets

OPTICAL DEFLECTOR

BACKGROUND OF THE INVENTION

1. Field of the Invention

The present invention relates to an optical deflector capable of being fabricated by techniques of micromechanics or the like.

2. Description of the Related Background Art

In recent years, development of a microactuator, using techniques of micromechanics has been energetically advanced. Electrostatic driving, piezoelectric driving, electromagnetic driving and the like can be employed as its driving means. A small-sized large-output (i.e., a relatively large deflection angle can be obtained by a relatively small electrical power) microactuator is increasingly required as demands for reduction in its cost, its application to mobile equipment, and the like increase. Particularly, an optical deflector for deflecting a movable mirror supported with a couple of torsion bars has been increasingly developed as a device capable of achieving a relatively simple optical sensor, an image forming apparatus, or the like.

As a method of driving the above-discussed movable mirror, Japanese Examined Patent Application Publication (KOKOKU) No. 60 (1985)-57051 proposes a method of deflecting or displacing a movable mirror 101 about a rotational axis (defined by a couple of torsion bars 104) by an electrostatic force acting between a couple of flat opposed electrodes 103 and the movable mirror 101, as illustrated in FIGS. 1A and 1B. Further, Japanese Patent Application Laid-Open (KOKAI) No. 4 (1992)-343318 proposes a method in which a pair of interdigitated comb electrodes 206 are formed on a movable mirror 201, another pair of interdigitated comb electrodes 207 are provided so as to mesh with the pair of interdigitated comb electrodes 206 with a gap therebetween, and the movable mirror 201 is deflected about a rotational axis (defined by a couple of torsion bars 204) by an electrostatic force acting between the two pairs of interdigitated comb electrodes 206 and 207, as illustrated in FIGS. 2A and 2B.

On the other hand, Japanese Examined Patent Application Publication (KOKOKU) No. 60 (1985)-57052 proposes a so-called moving coil method in which a coil 306 is provided on a movable mirror 301, plural permanent magnets 307 are disposed near the coil 306, and the movable mirror 301 is deflected about a rotational axis (defined by a couple of torsion bars 304) by a magnetic field generated by a current flow through the coil 306 and acting on the permanent magnets 307, as illustrated in FIGS. 3A and 3B. Further, Japanese Patent Application Laid-Open (KOKAI) No. 6 (1994)-82711 proposes a so-called moving magnet method in which a permanent magnet 407 is provided on a movable mirror 401, a coil 406, is disposed near the magnet 407, and the movable mirror 401 is deflected about a rotational axis (defined by a couple of torsion bars 404) by a magnetic field generated by a current flow through the coil 406 and acting on the permanent magnet 407, as illustrated in FIGS. 4A and 4B.

Furthermore, Japanese Patent Application Laid-Open (KOKAI) No. 60(1985)-107017 proposes an actuator in which a deflector or a movable mirror, as discussed above, is provided in a rotatable manner about two rotational axes, as illustrated in FIG. 5. In the actuator, a movable mirror 501 is supported by a gimbal 505 (i.e., a movable substrate or frame) using a couple of torsion bars 504. The gimbal 505 is supported by a substrate using another couple of torsion bars 504, and the rotational axis of the movable mirror 501 is perpendicular to that of the gimbal 505. Movable portions (i.e., the movable mirror 501 and the gimbal 505) are driven by electrostatic forces from two pairs of flat opposed electrodes 503, respectively. There is also a disclosure that the movable portions can be driven by magnetic means. In such a structure, resonance frequencies of the movable mirror 501 and the gimbal 505 can be set to predetermined values, respectively, and a two-axis optical deflector capable of forming an image by raster scanning can be achieved.

In the event that the drives about two rotational axes are carried out in an electrostatic manner in the above-discussed actuator having a gimbal structure, two sets of electrodes are disposed for the drives about two rotational axes, respectively. Therefore, the problem of crosstalk between electric fields generated by the two sets of electrodes is likely to occur, irrespective of the type of the electrodes (i.e., flat opposed electrodes, interdigitated comb electrodes, or the like). Similarly, in the event that the drives about two rotational axes are carried out in an electromagnetic manner, two sets of permanent magnets and two sets of electromagnetic coils are disposed for the drives about two rotational axes, respectively. Accordingly, problems of restriction of arrangement of the magnets and crosstalk between magnetic fields generated by the two sets of permanent magnets and electromagnetic coils are likely to occur, irrespective of the type of the electromagnetic driving (i.e., the moving magnet type, the moving coil type, or the like).

Further, in a case where one drive is carried out in an electrostatic manner using the flat opposed electrode, one of power generated for driving the movable portion and the displacement amount of the movable portion must be restricted owing to a structural disadvantage of the flat opposed electrode. In other words, if an inter-electrode distance (a distance between the flat opposed electrodes) is enlarged to achieve a large displacement amount of the movable portion, a driving voltage for achieving a desired displacement angle of the movable portion must be unavoidably increased.

SUMMARY OF THE INVENTION

According to one aspect of the present invention for solving the above problem, there is provided an optical deflector which includes a movable mirror, a gimbal for rotatably supporting the movable mirror about a first rotational axis with a first support portion, and a frame for rotatably supporting the gimbal with a second support portion about a second rotational axis that forms an angle relative to the first rotational axis. A moving comb electrode is provided on the gimbal and has a surface extending approximately parallel to a direction of a rotation movement of the gimbal. A stationary comb electrode is disposed facing the surface of the moving comb electrode. An electrostatic driving unit displaces the gimbal by an electrostatic force acting between the moving comb electrode and the stationary comb electrode. An electromagnetic driving unit displaces the movable mirror by an electromagnetic force.

On the basis of the above construction, it is possible to take the following more specific structures. In a first structure, the moving comb electrode is a movable interdigitated comb electrode, and the stationary comb electrode is a stationary interdigitated comb electrode arranged to mesh with the movable interdigitated comb electrode with a gap therebetween. Alternatively, in a second structure, moving comb electrodes are provided on both of opposite end portions of the gimbal (end portions in a direction perpendicular to the first rotational axis of the gimbal), each moving comb electrode has a relatively wide planar surface approximately parallel to the direction of the rotational movement of the gimbal, and the stationary comb electrode has a relatively wide planar surface facing the planar surface of the moving comb electrode.

In a third structure, the first support portion is comprised of a pair of torsion bars for rotatably supporting the movable mirror in a torsional-vibration manner about the first rotational axis relative to the gimbal, and the second support portion is comprised of a pair of torsion bars for rotatably supporting the gimbal in a torsional-vibration manner about the second rotational axis relative to the frame. When such torsion bars are used, it is possible to readily achieve resonance driving and high-speed scanning. However, any type of a support portion can be used so long as the movable mirror and the gimbal can be rotatably supported. Further, the first rotational axis of the movable mirror can form any angle, such as right angles, relative to the second rotational angle of the gimbal.

In a fourth structure, the electromagnetic driving unit includes a stationary coil and a movable magnet disposed on the movable mirror, and the movable mirror is displaced by an electromagnetic force acting between the stationary coil and the movable magnet. Alternatively, in a fifth structure, the electromagnetic driving unit includes at least a stationary magnet and a movable coil disposed on the movable mirror, and the movable mirror is displaced by an electromagnetic force acting between the stationary magnet and the movable coil. In this structure, a plurality of stationary magnets can be discretely arranged in a row parallel to the second rotational axis of the gimbal. With such an arrangement, a large deflection angle of the gimbal can be achieved.

In a sixth structure, at least one of the frame, the stationary comb electrode, a coil substrate carrying the stationary coil, and the stationary magnet is supported by a common substrate. In this structure, at least one of the stationary comb electrode, the coil substrate, and the stationary magnet can be disposed in a recess portion formed on the common substrate. Further, the stationary comb electrode can be disposed on a pull-out electrode formed on the common substrate, and the frame can be supported by the common substrate through a spacer.

In a seventh structure, at least one of the electromagnetic driving unit and the electrostatic driving unit can be constructed such that the movable mirror or the gimbal can be driven in a resonance vibration manner.

Further, according to another aspect of the present invention for solving the above problem, there is provided an image forming apparatus which includes a light source, and the above-described optical deflector for deflecting light from the light surface to form an image using the deflected light.

According to the present invention, it is possible to provide an optical deflector with a two-axis driving gimbal structure, in which a deflection angle of a movable portion can be made relatively large, a driving voltage for driving a movable portion can be made relatively low, a structural size can be reduced, high-speed scanning can be carried out, and crosstalk between driving signals for the two rotational axes can be reduced.

More specifically, the deflection angle can be made relatively large because of the electrostatic driving using the movable and stationary comb electrodes, which face each other at their planar surfaces extending approximately parallel to the direction of the rotational movement of the gimbal. Also, the driving voltage can be made relatively low because of the electromagnetic driving for displacing the movable mirror by the electromagnetic force, and the structural size can be reduced because of the use of such electrostatic driving and electromagnetic driving. Further, high-speed scanning can be achieved because the movable mirror is electromagnetically driven such that its moment of inertia can be comparatively decreased, and the crosstalk can be reduced because of properties of driving forces for rotations about the two axes (the first and second rotational axes) are made different from each other.

Further, when the recess portion is formed on the common substrate, it is possible to improve a positional precision of the stationary comb electrode, the stationary coil, or the stationary magnet placed at the recess portion. When a plurality of the stationary magnets are discretely arranged in a row parallel to the second rotational axis of the gimbal, both deflection angles about the first and second rotational axes can be increased.

Furthermore, according to the present invention, it is possible to achieve an image forming apparatus in which a structural size can be reduced, a driving voltage can be made relatively low, a deflection angle can be made relatively large, and a highly-precise image can be obtained.

These advantages, as well as others, will be more readily understood in connection with the following detailed description of the preferred embodiments and examples of the invention in connection with the drawings.

DESCRIPTION OF THE PREFERRED EMBODIMENTS

Figure 1A:
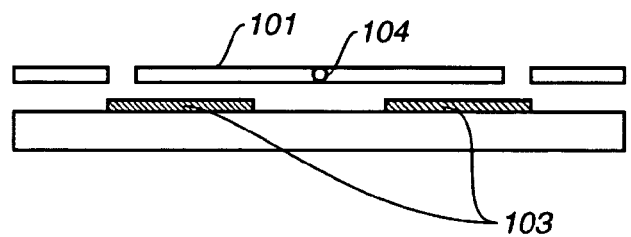
FIG. 1A is a cross-sectional view, taken along section A–A' of FIG. 1B, illustrating a first conventional optical deflector.
Figure 1B:
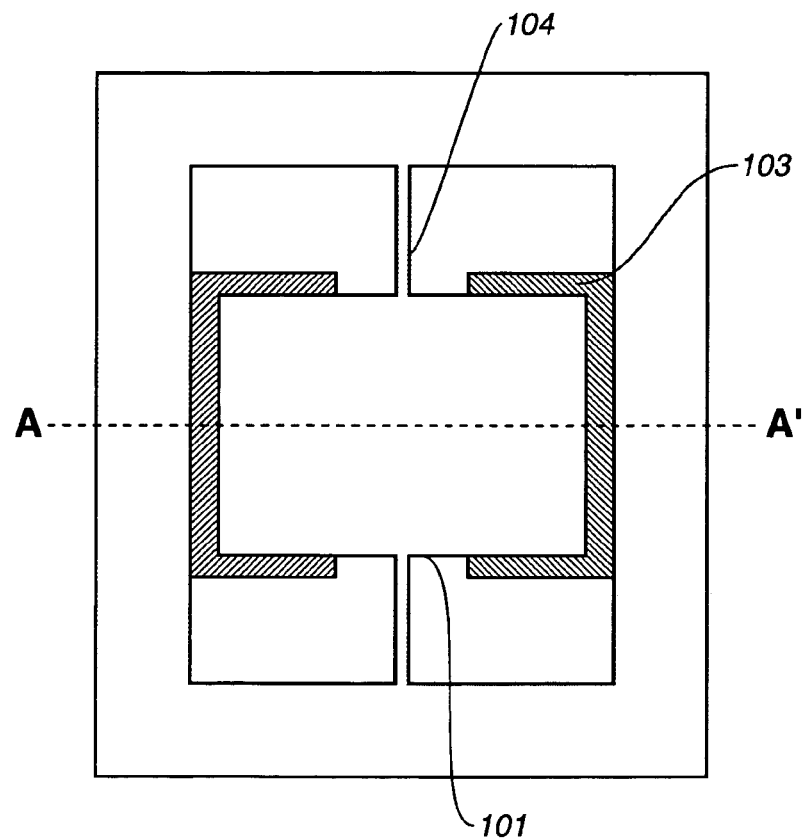
FIG. 1B is a plan view illustrating the optical deflector of FIG. 1A.
Figure 2A:
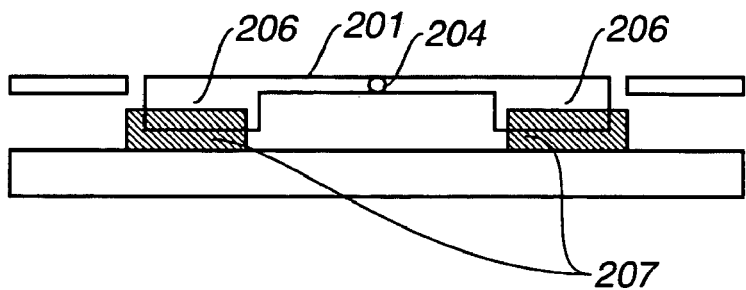
FIG. 2A is a cross-sectional view, taken along section A–A' of FIG. 2B, illustrating a second conventional optical deflector.
Figure 2B:
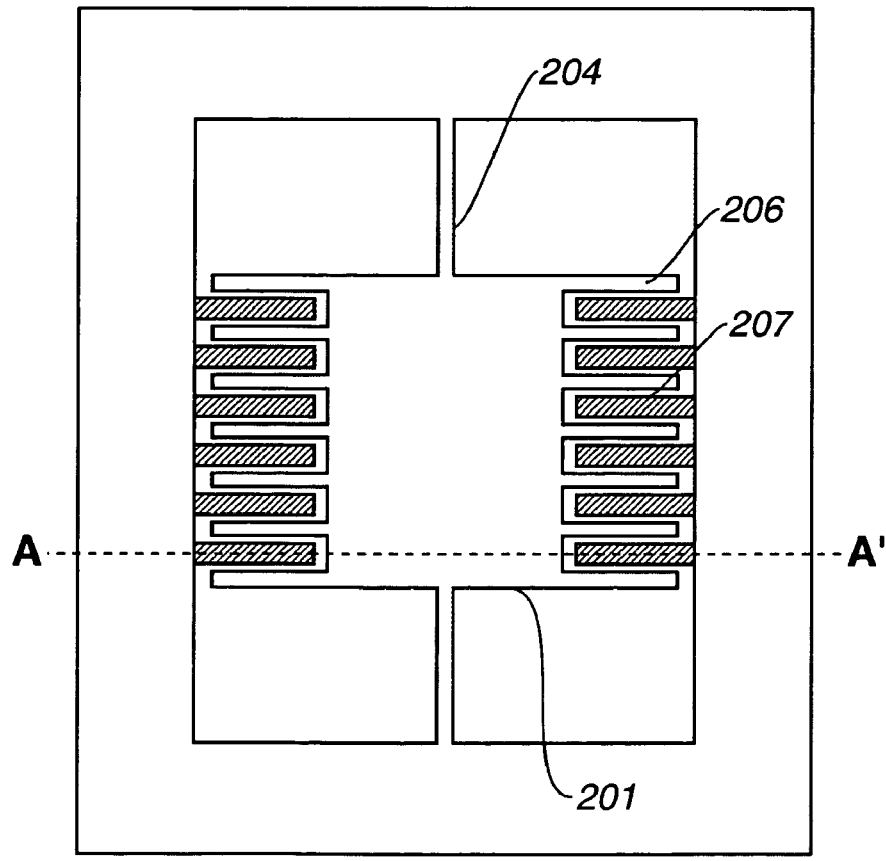
FIG. 2B is a plan view illustrating the optical deflector of FIG. 2A.
Figure 3A:
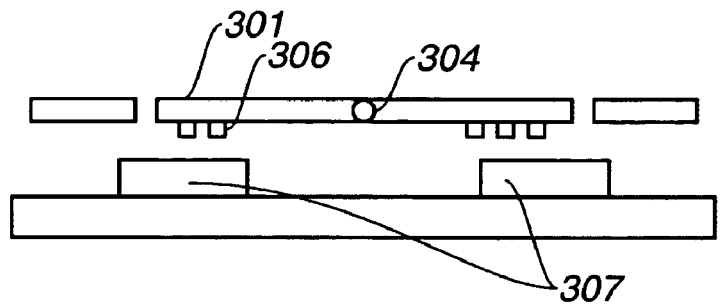
FIG. 3A is a cross-sectional view, taken along section A–A' of FIG. 3B, illustrating a third conventional optical deflector.
Figure 3B:
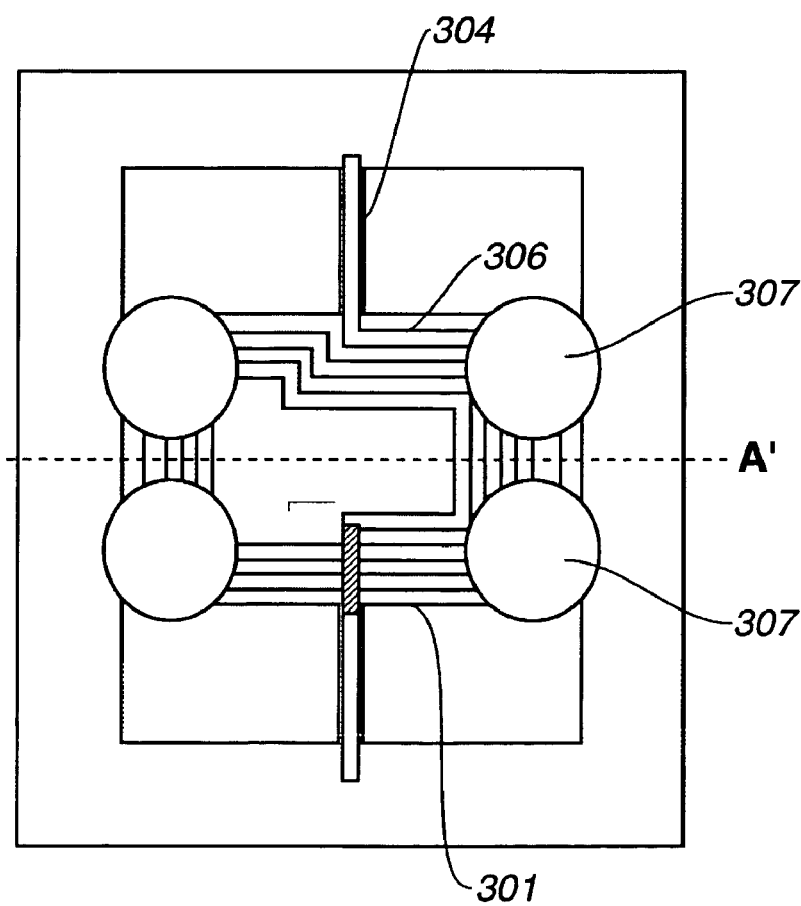
FIG. 3B is a plan view, viewed from a bottom side, illustrating the optical deflector of FIG. 3A.
Figure 4A:
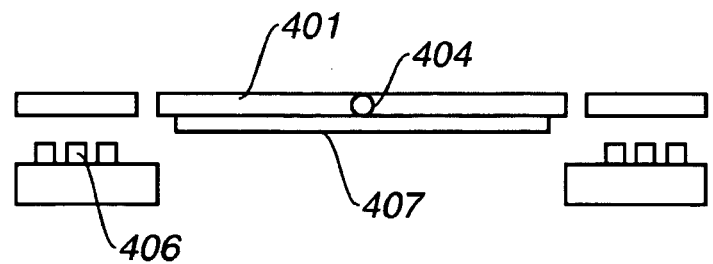
FIG. 4A is a cross-sectional view, taken along section A–A' of FIG. 4B, illustrating a fourth conventional optical deflector.
Figure 4B:
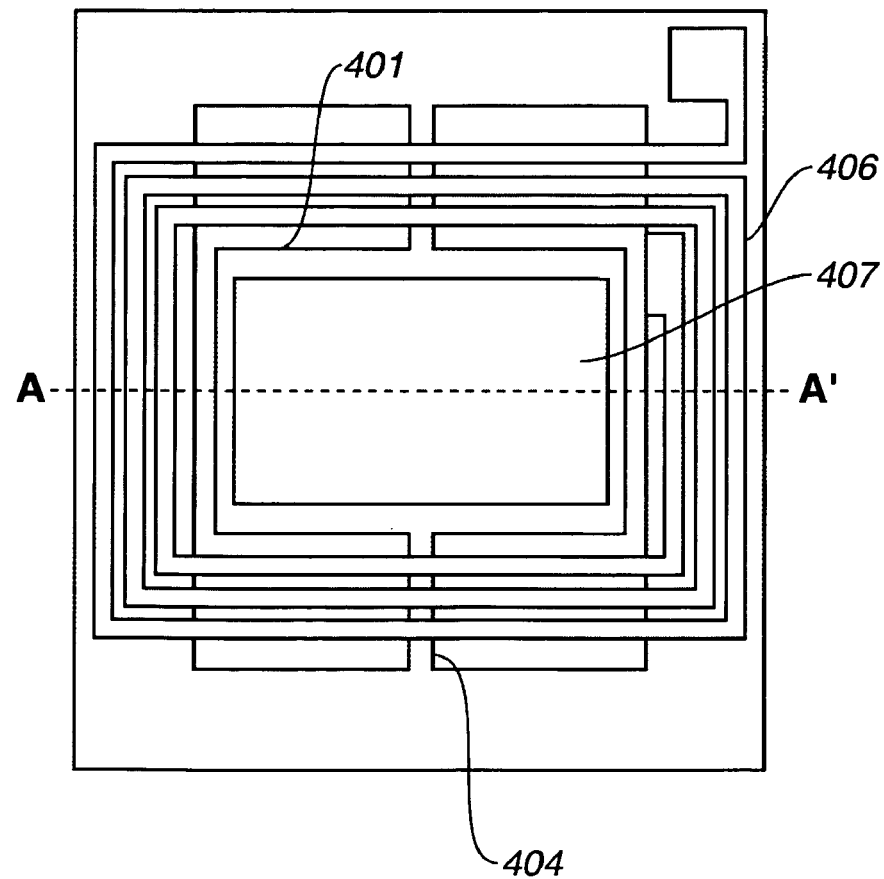
FIG. 4B is a plan view, viewed from a bottom side, illustrating the optical deflector of FIG. 4A.
Figure 5:
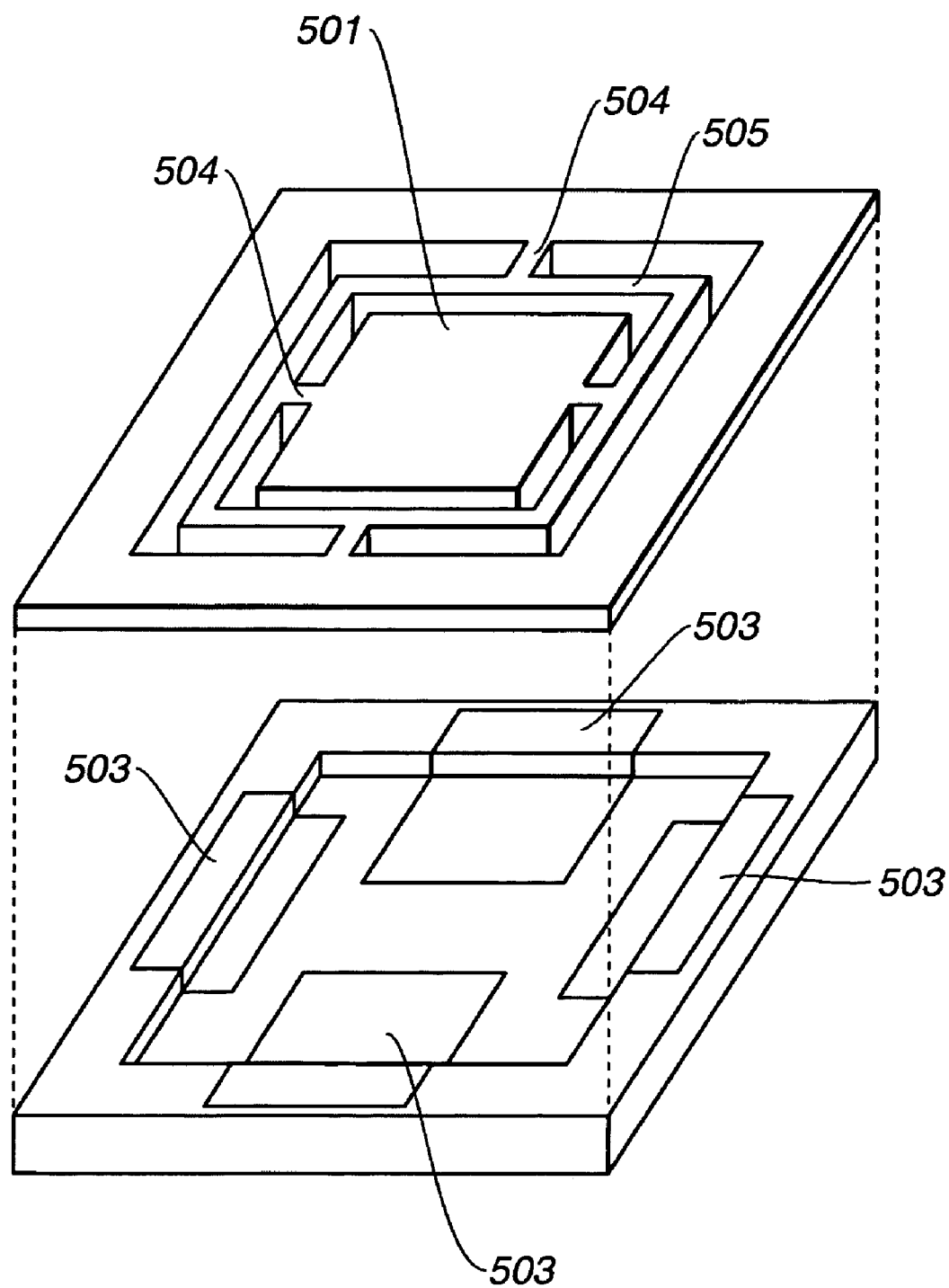
FIG. 5 is a perspective disassembled view illustrating a fifth conventional optical deflector.

Embodiments and more specific examples of an optical deflector and an image forming apparatus according to the present invention will hereinafter be described with reference to FIGS. 6A through 10.

A first embodiment of an optical deflector will be first described with reference to FIGS. 6A and 6B, and FIGS. 7A to 7C. In those figures, reference numeral 1 designates a movable mirror, reference numerals 2 and 4 designate torsion bars, reference numeral 3 designates a gimbal or a movable frame, reference numeral 5 designates a frame, reference numeral 6 designates a movable interdigitated comb electrode, reference numeral 7 designates a stationary interdigitated comb electrode, reference numeral 8 designates a pull-out electrode for pulling out the stationary interdigitated comb electrode 7, reference numeral 9 designates a common substrate, reference numeral 10 designates a spacer, reference numeral 11 designates a reflective film, reference numeral 20 designates a movable magnet, reference numeral 21 designates a stationary coil, reference numeral 22 designates a coil substrate, and reference numeral 23 designates a pull-out electrode for pulling out the stationary coil 21.

In the first embodiment, the movable mirror 1 provided with the reflective film 11 is rotatably supported by the gimbal 3 through a pair of the torsion bars 2. The gimbal 3 is rotatably supported by the frame 5 through another pair of the torsion bars 4. The gimbal 3 is rotatable in a torsional-vibration manner about a rotational axis perpendicular to the rotational axis of the movable mirror 1. The gimbal 3 is provided with two movable interdigitated comb electrodes 6, and two stationary interdigitated comb electrodes 7 are disposed so as to mesh with the two movable interdigitated comb electrodes 6 with a gap therebetween, respectively. Each stationary interdigitated comb electrode 7 is placed on the common substrate 9 via the pull-out electrode 8. The frame 5 is bonded to the common substrate 9 through the spacer 10.

Figure 6A:
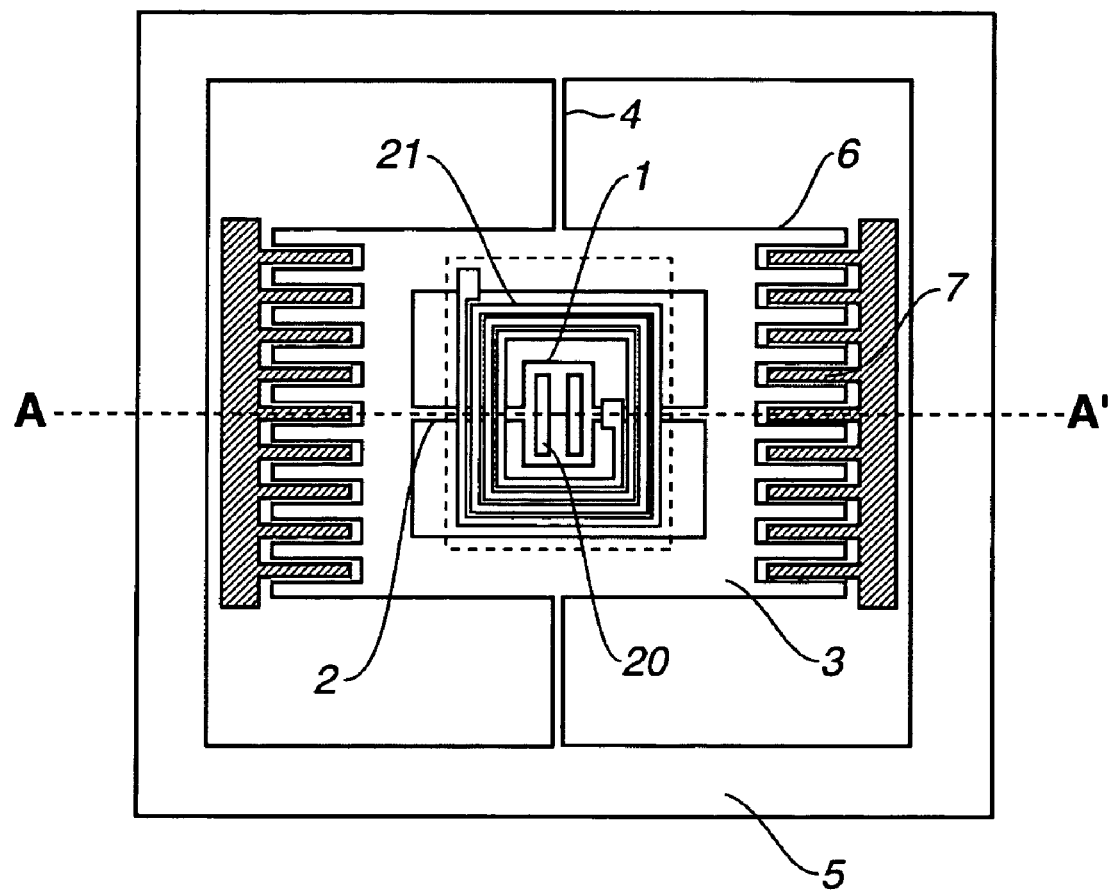
FIG. 6A is a plan view, viewed from a bottom side, illustrating an optical deflector of a first embodiment or a first example according to the present invention.
Figure 6B:
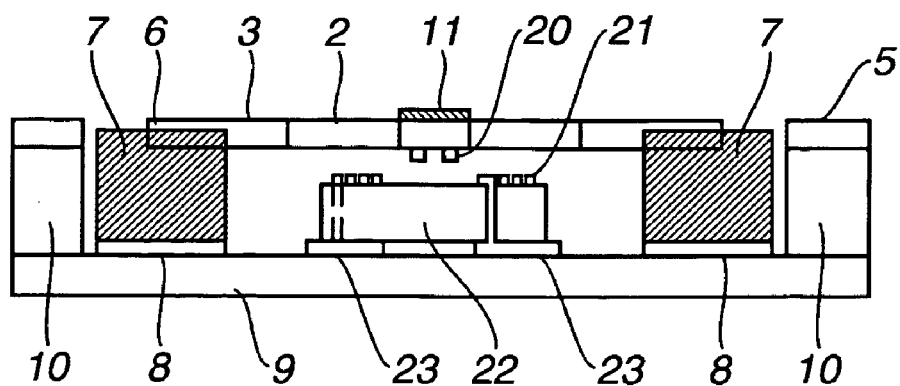
FIG. 6B is a cross-sectional view, taken along section A–A', illustrating the optical deflector of FIG. 6A.

On the other hand, the movable mirror 1 is driven by an electromagnetic force. The electromagnetic force is generated between the magnet 20 on the movable mirror 1 and the stationary coil 21 disposed on the common substrate 9 through the coil substrate 22 and the pull-out electrode 23. In this structure, the stationary coil 21 can be placed close to the magnet 20 because of the presence of the coil substrate 22. Accordingly, the electromagnetic force effectively acts on the magnet 20. In the structure of FIGS. 6A and 6B, the movable magnet 20 on the movable mirror 1 is displaced by a force due to a magnetic force generated by the stationary coil 21. It is, however, possible to displace a coil on the movable mirror by interaction between a current flowing in the coil and a magnetic field generated by a stationary magnet.

In the first embodiment, the gimbal 3 is driven by the electrostatic force generated between the interdigitated comb electrodes 6 and 7 as discussed above. The driving voltage in the drive by the interdigitated comb electrodes 6 and 7 can be reduced and the displacement amount in the drive by the interdigitated comb electrodes 6 and 7 can be enlarged, by appropriately designing the pitch of teeth of the interdigitated comb electrode and the area of mutually-facing surfaces of the interdigitated comb electrodes, as compared with the above-discussed conventional structure using the flat opposed electrodes. Especially, the length of a side at the end portion of the gimbal 3 can be made large, compared with that of the movable mirror 1, and the number of teeth of the interdigitated comb electrodes can be hence increased. Therefore, it is possible to enlarge a force for driving the gimbal 3.

In contrast, the electromagnetic driving causes the rotational movement of the movable mirror 1, that corresponds to a high-speed raster scanning. The moment of inertia of the movable mirror 1 can be decreased due to the electromagnetic driving structure, as compared with the gimbal 3 with the interdigitated comb electrodes 6, and the resonance frequency of the movable mirror 1 can be hence increased. Thus, a high-speed scanning of the small-sized movable mirror 1 can be achieved. Further, since the electromagnetic driving is characterized by a driving at a relatively low voltage, the movable mirror 1 undergoes no high voltage and the problem of short circuit can be eliminated.

Furthermore, the crosstalk between driving signals for rotations about the two rotational axes can be reduced, because the movable mirror 1 is electromagnetically driven while the gimbal 3 is driven by the electrostatic force due to the interdigitated comb electrodes 6 and 7. A high performance device can be hence obtained.

Figure 7A:
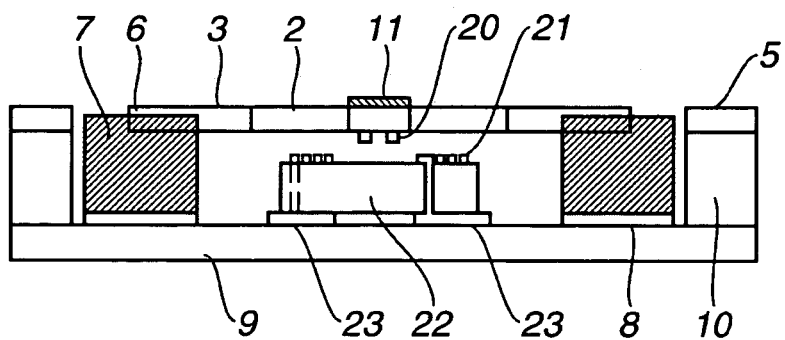
FIGS. 7A to 7C are cross-sectional views, taken along section A–A', illustrating driving conditions of the optical deflector of FIG. 6A, respectively.
Figure 7B:
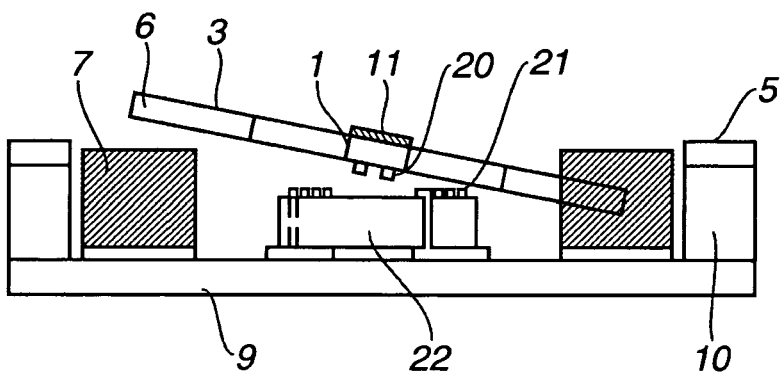
Figure 7C:
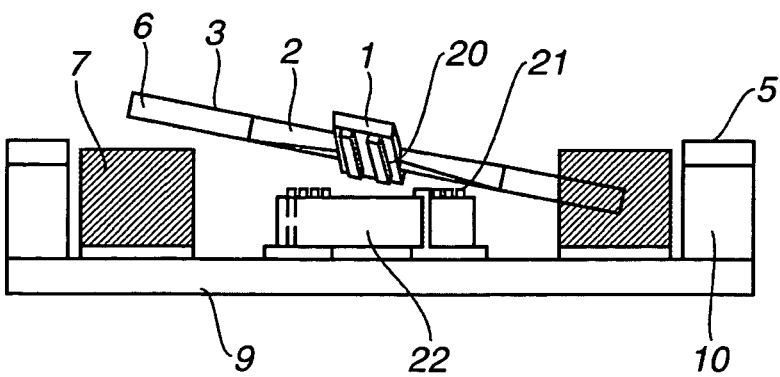

The driving manner of the first embodiment will be described with reference to FIGS. 7A to 7C. FIG. 7A shows a neutral condition prior to the drive, FIG. 7B shows a condition under which the gimbal 3 is deflected, and FIG. 7C shows a condition under which both the gimbal 3 and the movable mirror 1 are deflected. The movable mirror 1 and the gimbal 3 are deflected when the torsion bars 2 and 4 for respectively supporting the movable mirror 1 and the gimbal 3 are twisted. Thus, the deflection of the gimbal 3 is superimposed on the deflection of the movable mirror 1, and a two-dimensional deflection of the movable mirror 1 can be hence attained. While the deflection can be carried out by a DC driving described later, the movable mirror 1 can be driven with a relatively low electrical power consumption when the movable mirror 1 and the gimbal 3 are deflected using resonance vibrations, respectively.

Figure 8A:
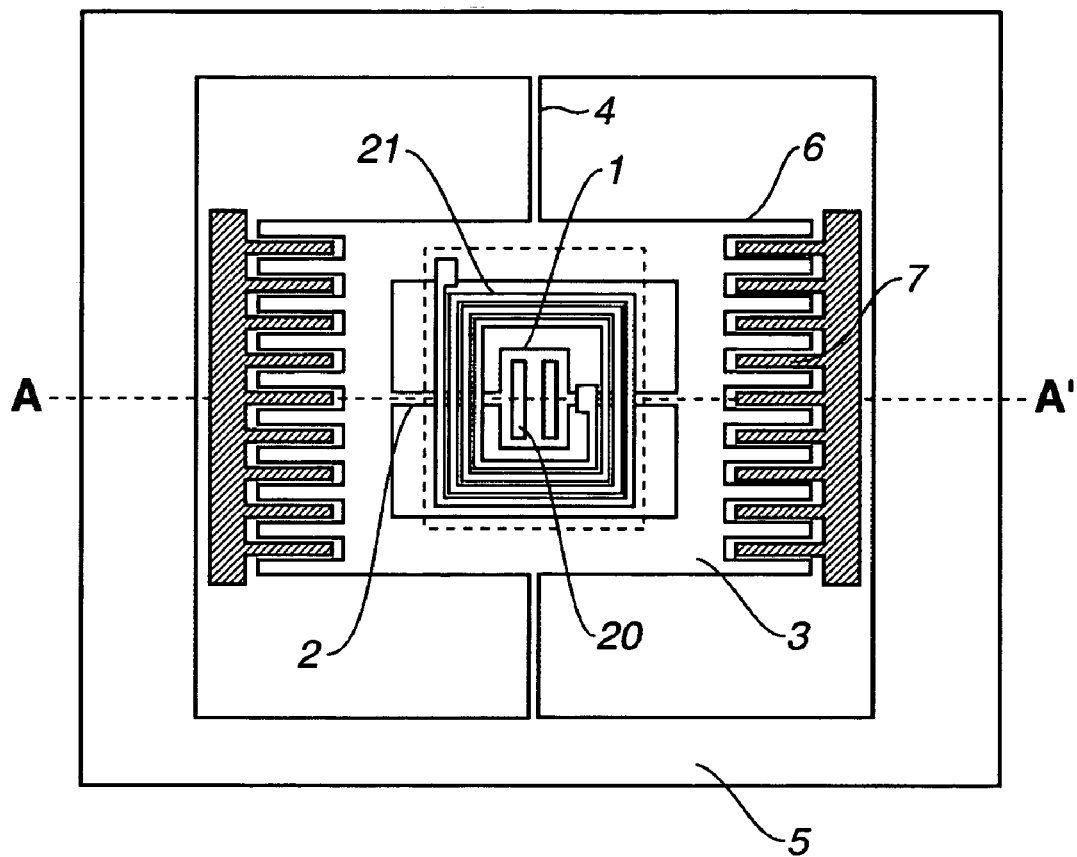
FIG. 8A is a plan view, viewed from a bottom side, illustrating an optical deflector of a second embodiment or a second example according to the present invention.
Figure 8B:
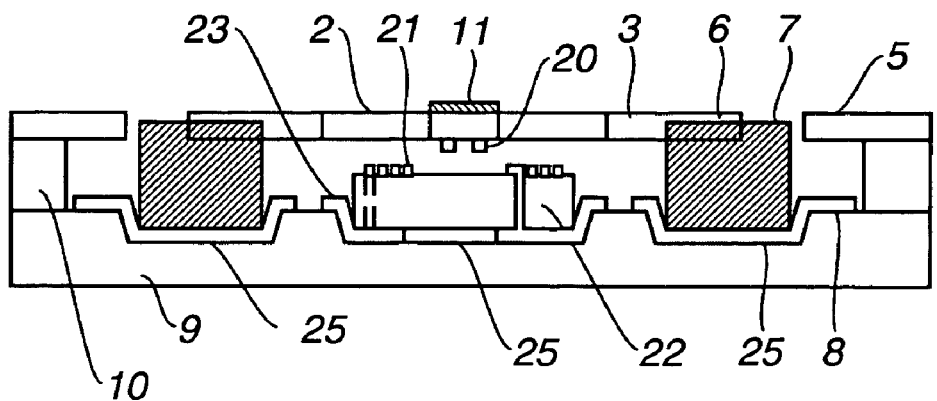
FIG. 8B is a cross-sectional view, taken along a line A–A', illustrating the optical deflector of FIG. 8A.

A second embodiment will be described with reference to FIGS. 8A and 8B. In those figures, reference numeral 25 designates a recess portion. In the second embodiment of the optical deflector, the stationary interdigitated comb electrodes 7 and the common substrate 9 are separately formed, and the stationary interdigitated comb electrodes 7 are placed on the common substrate 9 as illustrated in FIGS. 8A and 8B. In this construction, a positional relationship between the stationary interdigitated comb electrodes 7 and the common substrate 9 can be flexibly designed. Further, the stationary interdigitated comb electrodes 7 and the coil substrate 22 are placed on the recess portions 25 of the common substrate 9, respectively. Accordingly, locations thereof can be readily controlled. As for the other points, the second embodiment is substantially the same as the first embodiment.

Figure 9A:
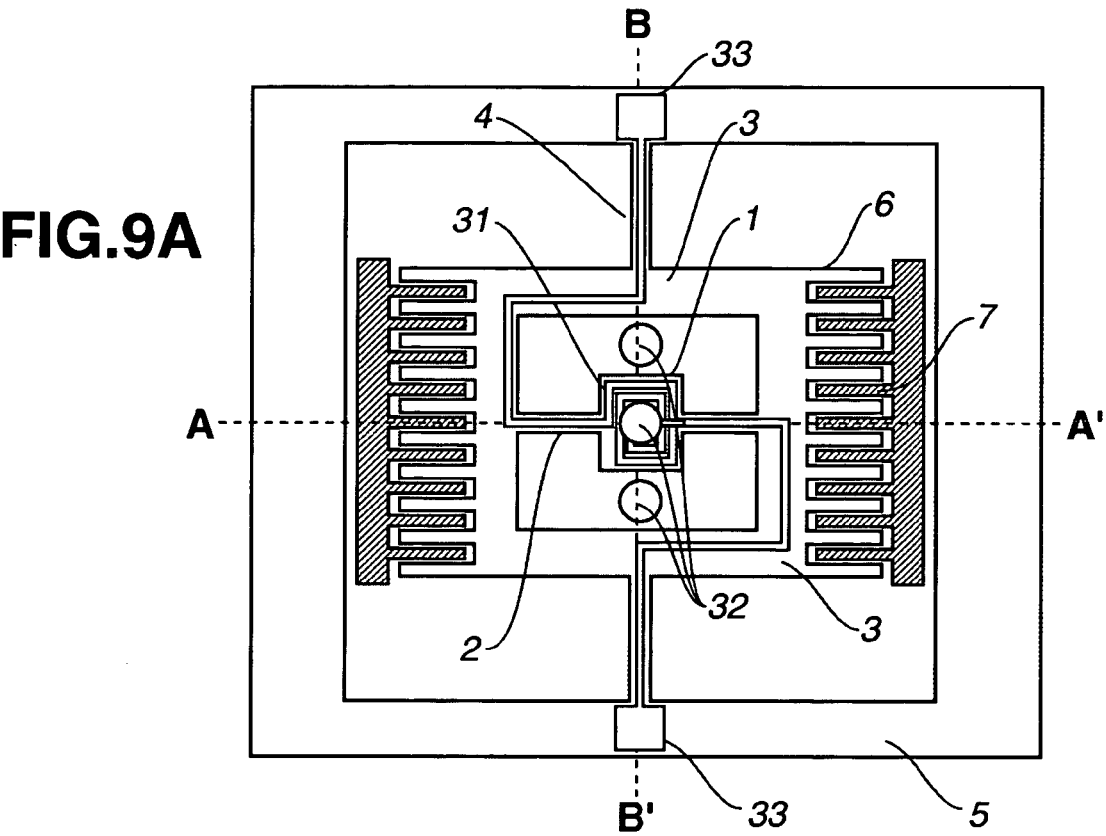
FIG. 9A is a plan view, viewed from a bottom side, illustrating an optical deflector of a third embodiment or a third example according to the present invention.
Figure 9B:
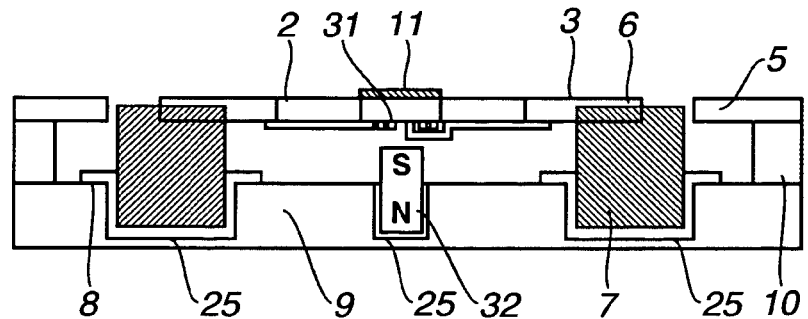
FIG. 9B is a cross-sectional view, taken along a line A–A', illustrating the optical deflector of FIG. 9A.
Figure 9C:
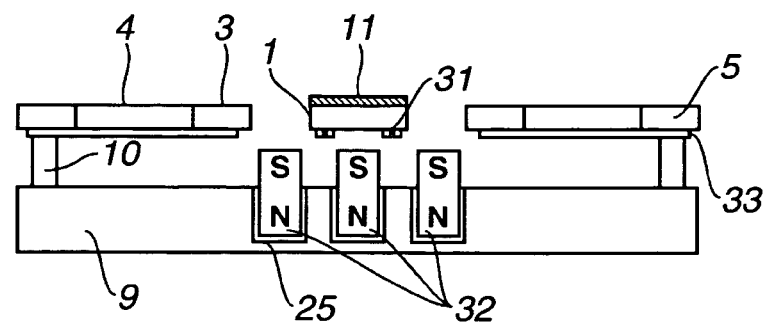
FIG. 9C is a cross-sectional view, taken along a line B–B', illustrating the optical deflector of FIG. 9A.

A third embodiment of the optical deflector will be described with reference to FIGS. 9A to 9C. In those figures, reference numeral 31 designates a movable coil, reference numeral 32 designates a stationary magnet, and reference numeral 33 designates an electrode pad. In the third embodiment of the optical deflector, the stationary magnets 32 are arranged in a row parallel to the rotational axis of the gimbal 3 as illustrated in FIGS. 9A to 9C. In this construction, the movable mirror 1 can be deflected without any influences of the displacement of the gimbal 3. As for the other points, the third embodiment is approximately the same as the first embodiment.

Figure 10:
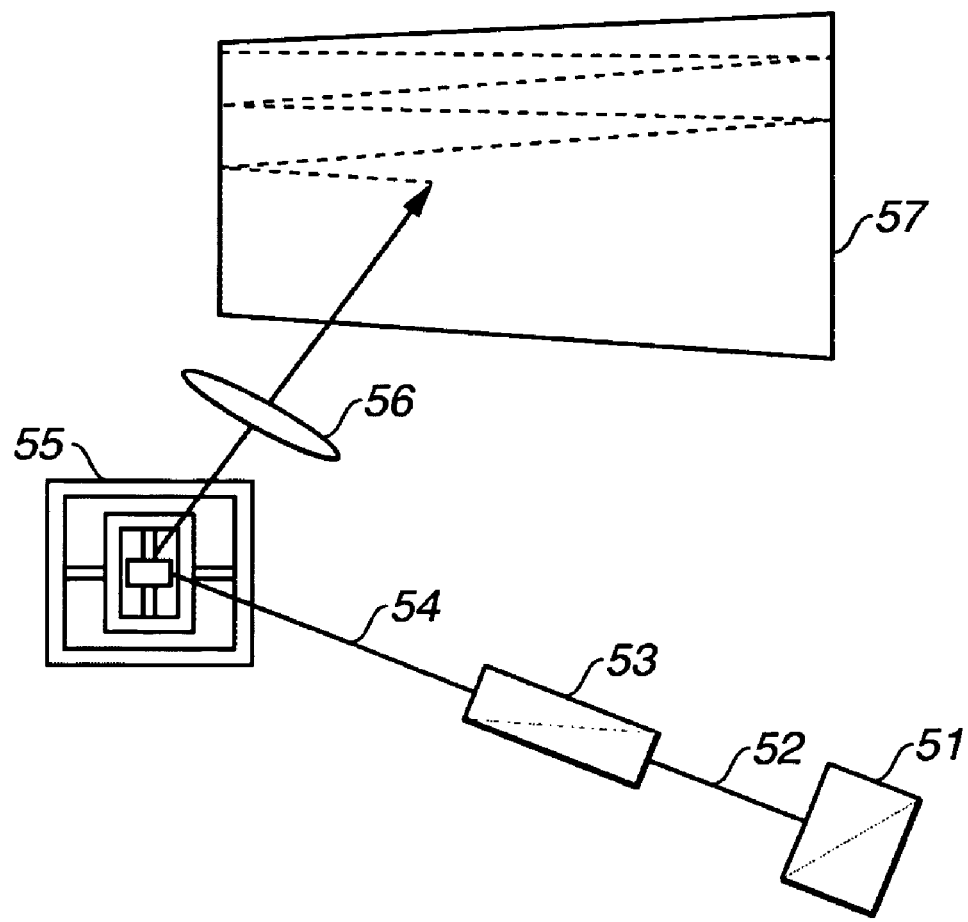
FIG. 10 is a view illustrating an image forming apparatus of a fourth embodiment or a fourth example according to the present invention.

A fourth embodiment of the image forming apparatus will be described with reference to FIG. 10. In FIG. 10, reference numeral 51 designates a driving portion for modulating a light source, reference numeral 52 designates a modulation signal, reference numeral 53 designates a light source to be directly modulated, reference numeral 54 designates directly-modulated output light, reference numeral 55 designates an optical deflector of the present invention, reference numeral 56 designates a correction optical system, and reference numeral 57 designates an image display member.

In this image forming apparatus, the optical deflector 55 used herein have technical advantages that the driving voltage can be made relatively low, that a high-speed scanning can be carried out, and that the deflection angle can be made relatively large. Therefore, in the image forming apparatus using the optical deflector 55, its cost and size can be reduced, the electrical power consumption can be lowered, and the resolution of the image can be increased.

Description will hereinafter be made to more specific examples of the present invention.

A first example of the optical deflector will be described with reference to FIGS. 6A through 7C. Its schematic construction is described in the first embodiment. In the first example, the movable mirror 1, the torsion bars 2, the gimbal 3, the torsion bars 4 and the frame 5 are integrally formed by subjecting a silicon substrate having a thickness of 150 microns to an etching process. The reflective film 11 is formed on a surface of the movable mirror 1, and two movable magnets 20 are bonded to a surface of the movable mirror 1 opposite to the surface on which the reflective film 11 is formed.

The stationary coil 21 is formed on the coil substrate 22, and the coil substrate 22 is disposed on the common substrate 9 through the two pull-out electrodes 23. The two pull-out electrodes 23 are connected to innermost and outermost ends of the stationary coil 21 via electrical wires penetrating the coil substrate 22, respectively.

In the optical deflector of the first example, there are provided an electrostatic driving unit (not shown) for generating a potential difference between the movable interdigitated comb electrode 6 and the stationary interdigitated comb electrode 7 to drive the gimbal 3 by the electrostatic force acting between the movable interdigitated comb electrode 6 and the stationary interdigitated comb electrode 7, and an electromagnetic driving unit (not shown) for generating a current in the stationary coil 21 to drive the movable mirror 1 by the magnetic force acting on the movable magnet 20.

In the first example, the movable mirror 1 and the gimbal 3 are driven in a resonance vibration manner, respectively. A description will be given for a driving method of the gimbal 3. The electrostatic driving unit including a driving electrical power and a control circuit applies an alternating voltage between the movable interdigitated comb electrode 6 and the stationary interdigitated comb electrode 7 to vibrate the gimbal 3. The alternating voltage has the same frequency as a torsional vibration frequency of the gimbal 3.

The peripheral size of the gimbal 3 to be driven in the resonance vibration manner is 4 (mm)×10 (mm), and its thickness is 150 microns, The longitudinal length of the torsion bar 4 for supporting the gimbal 3 is 5 mm, its width is 20 microns, and its thickness is 150 microns. Further, the gimbal 3 is adapted to depict two (2) frames of the raster scanning during its single reciprocating vibration. Here, the frame rate is 60 Hz, and accordingly the resonance frequency of the gimbal 3 is 30 Hz. The deflection angle of the gimbal 3 is set to ±10 degrees.

Further, the moment of inertia of the gimbal 3 is about $1\times10^{-10}$ (kgm$^2$), the spring constant of the torsion bar 4 is about $3.6\times10^{-6}$ (N/m). The Q-value of its resonance is about 100, and a torque necessary for the vibration with the deflection angle of ±10 degrees is about $5\times10^{-9}$ (Nm). The length of a longer side of the gimbal 3 is 10 mm as described above, and a force F calculated from the above torque is about $1\times10^{-6}$ (N).

On the other hand, the force F generated by the interdigitated comb electrodes 6 and 7 is written as $F=\frac{1}{2}(dC/dx)V^2$, where x is the displacement amount, C is the electrostatic capacitance between the movable interdigitated comb electrode 6 and the stationary interdigitated comb electrode 7, and dC/dx is a change of C depending on a change of the displacement (deflection) of the gimbal 3. The gap between the interdigitated comb electrodes 6 and 7 is 10 microns, and the width of the tooth of the interdigitated comb electrode is 10 microns. Accordingly, the pitch of the teeth of interdigitated comb electrode is 40 microns. The number of the teeth of the interdigitated comb electrode is 100 since the length of the side of the gimbal 3 provided with the interdigitated comb electrode 6 is 4000 microns (4 mm). The length of the tooth of the interdigitated comb electrode 6 is 300 microns. Since the Q-value of the resonance vibration is 100, a voltage necessary for the vibration with the deflection angle of ±10 degrees is calculated to be about six (6) V by using the above formula.

A description will now be given for a driving method of the movable mirror 1. The electromagnetic driving unit including a driving electrical power and a control circuit causes a flow of an alternating current in the stationary coil 21 to generate an alternating magnetic field. The alternating current has the same frequency as a torsional vibration frequency of the movable mirror 1. The movable mirror 1 is driven by interaction between the magnetic field and the movable magnet 20.

The peripheral size of the movable mirror 1 is 1.1 (mm)×1.3 (mm), its thickness is 150 microns, and its moment of inertia is about $7\times10^{-14}$ (kgm$^2$). The longitudinal length of the torsion bar 2 for supporting the movable mirror 1 is 3.7 mm, its width is 100 microns, and its thickness is 150 microns. The resonance frequency of the movable mirror 1 is 20 kHz, and its deflection angle is set to ±12 degrees. Further, the wire width of the stationary coil 21 is 30 microns, its height is 50 microns, and the number of its turn is 40 turns. Here, the Q-value of the resonance vibration is about 3000, and a voltage needed to drive the movable mirror 1 is about eight (8) V.

The above-discussed optical deflector of this example has such technical advantages that the displacement angle (deflection angle) can be made relatively large, the driving voltage can be made relatively low, the size can be reduced, high-speed scanning can be carried out, and the crosstalk between the two driving signals can be reduced.

A second example of the optical deflector will be described with reference to FIGS. 8A and 8B. Its schematic construction is described in the second embodiment, and the structure of the second example is approximately the same as that of the first example.

The second example is different from the first example in that the stationary interdigitated comb electrodes 7 and the coil substrate 22 are placed on the recess portions 25 formed on the common substrate 9, respectively, as illustrated in FIGS. 8A and 8B. The recess portion 25 can be precisely formed on the common substrate 9 by photolithography and etching. In the second example, a single crystal silicon substrate with a (100) face is used as the common substrate 9, and the recess portion 25 having a depth of 200 microns is formed using 30%-water solution of potassium hydroxide heated to 100° C.

In the second example, the stationary interdigitated comb electrodes 7 and the coil substrate 22 are placed on the recess portions 25 of the common substrate 9, respectively, so that a relative positional relationship between the movable interdigitated comb electrode 6 and the stationary interdigitated comb electrode 7 and a relative positional relationship between the movable mirror 1 and the coil substrate 22 can be precisely established.

A third example of the optical deflector will be described with reference to FIGS. 9A through 9C. Its schematic construction is described in the third embodiment. Also in this example, the movable mirror 1 is rotatably supported by the gimbal 3 through a couple of the torsion bars 2. The reflective film 11 is formed on a surface of the movable mirror 1, and the movable coil 31 is formed on a surface of the movable mirror 1 opposite to the surface on which the reflective film 11 is formed. Electrical wires are pulled out from innermost and outermost ends of the movable coil 31 through the torsion bar 2, the gimbal 3 and the torsion bar 4, and are connected to the electrode pads 33 formed on the frame 5, respectively.

Further, the gimbal 3 is rotatably supported by the frame 5 through a couple of the torsion bars 4 about the rotational axis perpendicular to the rotational axis of the movable mirror 1. Also in this example, the movable mirror 1, the torsion bars 2, the gimbal 3, the torsion bars 4 and the frame 5 are integrally formed by subjecting a silicon substrate having a thickness of 150 microns to an etching process. Like the above example, the gimbal 3 is provided with two movable interdigitated comb electrodes 6, and two stationary interdigitated comb electrodes 7 are disposed so as to mesh with the two movable interdigitated comb electrodes 6 with a gap therebetween, respectively. The frame 5 is bonded to the common substrate 9 through the spacer 10.

In the third example, two stationary interdigitated comb electrodes 7 and three stationary magnets 32 are disposed on plural recess portions 25 formed on the surface of the common substrate 9, respectively. The two stationary interdigitated comb electrodes 7 are placed on the recess portions through the pull-out electrodes 8, respectively. The three stationary magnets 32 are fixed to the recess portions 25 with adhesive, respectively. The recess portion 25 of this example is formed by a dry etching using high-density plasma.

Each of the three stationary magnets 32 is a cylindrical permanent magnet containing Fe, Cr and Co, and is magnetized in its longitudinal direction. A direction of magnetization of a central stationary magnet 32 is opposite to directions of magnetization of the stationary magnets 32 placed on both sides of the central stationary magnet 32. This placement is an effective arrangement for the magnetic field for driving the movable mirror 1 to act on the movable coil 31. The number, magnetization directions and arrangement of the stationary magnets 32 are, however, not limited to those described above. The number, magnetization directions and arrangement can be any of a number of choices so long as the magnetic field can effectively act on the movable coil 31.

Further, the three stationary magnets 32 are arranged in a row parallel to the extending direction of the torsion bar 4 for supporting the gimbal 3, as illustrated in FIG. 9A. Accordingly, a range of the rotational movement of the gimbal 3 is not restricted by the presence of the three stationary magnets 32, and the deflection angle of the gimbal 3 can be made large. Furthermore, though the three stationary magnets 32 are arranged in a direction perpendicular to the extending direction of the torsion bar 2 for supporting the movable coil 31, the edge portion of the vibrating movable mirror 1 is unlikely to come into contact with the stationary magnets 32 since the three stationary magnets 32 are discretely disposed with a space therebetween, as illustrated in FIG. 9C. Hence, the deflection angle of the movable mirror 1 can also be made large.

In the optical deflector of the third example, there are further provided an electrostatic driving unit (not shown) for generating a potential difference between the movable interdigitated comb electrode 6 and the stationary interdigitated comb electrode 7 to drive the gimbal 3 by the electrostatic force acting between the movable interdigitated comb electrode 6 and the stationary interdigitated comb electrode 7, and an electromagnetic driving unit (not shown) for generating a current flow in the movable coil 31 to drive the movable mirror 1 by interaction between the magnetic field generated by the current flow and the stationary magnets 32.

In the third example, the movable mirror 1 is driven in a resonance vibration manner, and the gimbal 3 is driven by a DC control using a sawtooth-wave driving signal. As regards a driving method of the gimbal 3, the electrostatic driving unit including the driving electrical power and the control circuit applies a sawtooth-wave (its frequency is 60 Hz) electrostatic force between the movable interdigitated comb electrode 6 and the stationary interdigitated comb electrode 7 to deflect the gimbal 3 in a range with a deflection angle of ±10 degrees.

In the third example, the peripheral size of the gimbal 3 is 4 (mm)×10 (mm), and its thickness is 150 microns. The longitudinal length of the torsion bar 4 for supporting the gimbal 3 is 4 mm, its width is 130 microns (this value is considerably large as compared with that of the above example), and its thickness is 150 microns. The resonance frequency of the gimbal 3 is 600 Hz, the spring constant of the torsion bar 4 is about $1.5 \times 10^{-3}$ (N/m), and a torque necessary for the vibration of the gimbal 3 with the deflection angle of ±10 degrees is about $2.5 \times 10^{-4}$ (Nm). Here, a necessary voltage is about 1.2 kV.

In the third example, the DC driving by the sawtooth wave, but not the resonance vibration driving, is used for the drive of the gimbal 3 as discussed above. Although the driving voltage is relatively high in the DC driving, the DC driving is advantageous, as compared with the resonance vibration driving using a reciprocating movement that requires memory by one frame, in that there is no need to rearrange image data in forming an image.

A description will now be given for a driving method of the movable mirror 1. The electromagnetic driving unit including the driving electrical power and the control circuit causes a flow of an alternating current in the movable coil 31 to generate an alternating magnetic field. The alternating current has the same frequency as a torsional vibration frequency of the movable mirror 1. The movable mirror 1 is driven by interaction between the magnetic field and the three stationary magnets 32.

The peripheral size of the movable mirror 1 is 1.1 (mm)×1.3 (mm), its thickness is 150 microns, and its moment of inertia is about $7 \times 10^{-14}$ (kgm²). The longitudinal length of the torsion bar 2 for supporting the movable mirror 1 is 3.7 mm, its width is 100 microns, and its thickness is 150 microns. The resonance frequency of the movable mirror 1 is 20 kHz, and its deflection angle is set to ±12 degrees.

Further, the wire width of the movable coil 31 is 30 microns, its width is one (1) micron, and the number of its turn is ten (10) turns. In this case, the Q-value of resonance is about 3000, and a voltage needed to drive the movable mirror 1 is about ten (10) V.

The above-discussed optical deflector of this example has technical advantages that the movable mirror 1 can be deflected without restricting the deflection angle of the gimbal 3 since the stationary magnets 32 are arranged in a row parallel to the rotational axis of the gimbal 3, and that the length of the stationary magnet 32 can be increased owing to the placement of the stationary magnet 32 on the recess portion 25, resulting in an increase in the magnetic driving force.

Description will now be made to a fourth example of the image forming apparatus using the optical deflector of the present invention with reference to FIG. 10. Its schematic construction is described in the fourth embodiment.

In a structure illustrated in FIG. 10, the light source 53 is directly modulated by the modulation signal 52 supplied from the drive portion 51 for modulating the light source. In the fourth example, a red-color semiconductor laser is used as the light source 53 to be directly modulated. Alternatively, the light source 53 can be comprised of red, blue and green light sources capable of being directly modulated, and a color-mixing optical system for mixing red, blue and green light from the three light sources. The directly-modulated output light 54 from the light source 53 is directed onto a reflective surface of the optical deflector 55 of the present invention. Light, which is two-dimensionally deflected by the optical deflector 55, is transmitted through the correction optical system 56, and an image of the light is displayed on the image display member 57. The correction optical system 56 is an optical system for correcting distortion of the image due to projection.

The optical deflector 55 used in this example is an optical deflector of the second example capable of being resonantly vibrated about both two rotational axes. The output light 54 is raster-scanned by the optical deflector 55, and the image is displayed on the image display member 57. A reciprocating image depicting at a frequency of 20 kHz is executed by a high-speed scanning of the movable mirror. The deflection angle is ±10 degrees, and accordingly the reflection angle of the light is ±20 degrees. In contrast, a reciprocating image depicting at a frequency of 30 Hz is executed by a low-speed scanning of the gimbal. Here, the deflection angle is ±8 degrees, and accordingly the reflection angle of the light is ±16 degrees. Further, a driving voltage for driving the optical deflector 55 is eight (8) V.

The above-discussed fourth example of the image forming apparatus is advantageous in that a compact structure can be achieved, the drive can be performed at a relatively low voltage, the deflection angle can be increased, and a highly-precise image can be obtained.

While the present invention has been described with respect to what is presently considered to be the preferred embodiments and examples, it is to be understood that the invention is not limited to the disclosed embodiments and examples. The present invention is intended to cover various modifications and equivalent arrangements included within the spirit and the scope of the appended claims.

This application claims priority from Japanese Patent Application No. 2003-415786, filed Dec. 12, 2003, which is hereby incorporated by reference.

What is claimed is:

1. An optical deflector comprising:
   a movable mirror;
   a gimbal for rotatably supporting said movable mirror about a first rotational axis with a first support portion;
   a frame for rotatably supporting said gimbal with a second support portion about a second rotational axis that forms an angle relative to the first rotational axis;
   a moving comb electrode, said moving comb electrode (a) being provided along the entire length of a side of an end of said gimbal so that said moving comb electrode extends from end to end of the side of the end of said gimbal and (b) having a surface extending approximately parallel to a direction of a rotational movement of said gimbal, wherein the length of the side of the end portion of said gimbal on which said moving comb electrode is provided is longer than the length of said movable mirror;
   a stationary comb electrode, said stationary comb electrode being disposed facing the surface of said moving comb electrode;
   an electrostatic driving unit for displacing said gimbal about the second rotational axis by an electrostatic force acting between said moving comb electrode and said stationary comb electrode; and
   an electromagnetic driving unit for displacing said movable mirror about the first rotational axis by an electromagnetic force.

2. An optical deflector according to claim 1, wherein said first support portion comprises a first pair of torsion bars, and said second support portion comprises a second pair of torsion bars.

3. An optical deflector according to claim 1, wherein said moving comb electrode is a movable interdigitated comb electrode, and said stationary comb electrode is a stationary interdigitated comb electrode arranged to mesh with said movable interdigitated comb electrode with a gap between said movable interdigitated comb electrode and said stationary interdigitated comb electrode.

4. An optical deflector according to claim 1, wherein said electromagnetic driving unit comprises a stationary coil and a movable magnet, the movable magnet being disposed on said movable mirror, and said movable mirror is adapted to be displaced by an electromagnetic force acting between said stationary coil and said movable magnet.

5. An optical deflector according to claim 4, wherein a plurality of said stationary magnets are arranged in a row parallel to the second rotational axis of said gimbal.

6. An optical deflector according to claim 5, wherein said plurality of said stationary magnets comprises three cylindrical permanent magnets.

7. An optical deflector according to claim 6, wherein a center cylindrical permanent magnet of said three cylindrical permanent magnets has a direction of magnetization opposite to that of adjacent of said cylindrical permanent magnets.

8. An optical deflector according to claim 1, wherein said electromagnetic driving unit comprises at least a stationary magnet and a movable coil, the movable coil being disposed on said movable mirror, and said movable mirror is adapted to be displaced by an electromagnetic force acting between said stationary magnet and said movable coil.

9. An optical deflector according to claim 1, further comprising a common substrate, wherein at least one of said frame, said stationary comb electrode, a coil substrate carrying a stationary coil of said electromagnetic unit, and a stationary magnet of said electromagnetic unit is supported by said common substrate.

10. An optical deflector according to claim 9, wherein said frame is supported by said common substrate through a spacer.

11. An optical deflector according to claim 9, wherein a recess portion is formed in said common substrate, and at least one of said stationary comb electrode, said coil substrate, and said stationary magnet is disposed on said recess portion formed on said common substrate.

12. An optical deflector according to claim 1, wherein at least one of said electromagnetic driving unit and said electrostatic driving unit drives at least one of said movable mirror and said gimbal in a resonance vibration manner.

13. An image forming apparatus comprising:
a light source; and
the optical deflector recited in claim 1, said optical deflector deflecting light from said light source to form an image using the deflected light.

14. An image forming apparatus according to claim 13, wherein the optical deflector performs high speed scanning through resonance vibration of at least one of said gimbal and said movable mirror.

15. An image forming apparatus according to claim 13, wherein a plurality of said light sources are provided, with each of said plurality of light sources emitting a different color light.

* * * * *

UNITED STATES PATENT AND TRADEMARK OFFICE
CERTIFICATE OF CORRECTION

PATENT NO.         : 7,220,009 B2                                         Page 1 of 1
APPLICATION NO.    : 11/003455
DATED              : May 22, 2007
INVENTOR(S)        : Shimada et al.

It is certified that error appears in the above-identified patent and that said Letters Patent is hereby corrected as shown below:

ON THE TITLE PAGE:
At Item (56) U.S. PATENT DOCUMENTS, insert --6,819,822 B2 11/2004 Behin et al.--
At Item (56) FOREIGN PATENT DOCUMENTS, "60-082711 3/1984" should read --60-082711 3/1994--.

COLUMN 7:
Line 19, "have" should read --has--.
Line 26, "to" should read --of--.

Signed and Sealed this

Tenth Day of February, 2009

JOHN DOLL
*Acting Director of the United States Patent and Trademark Office*